US012398023B2

(12) United States Patent
Sakurai et al.

(10) Patent No.: US 12,398,023 B2
(45) Date of Patent: Aug. 26, 2025

(54) CRANE, AND CONTROL METHOD OF CRANE

(71) Applicant: KOBELCO CONSTRUCTION MACHINERY CO., LTD., Hiroshima (JP)

(72) Inventors: Hitoshi Sakurai, Hyogo (JP); Shintaro Sasai, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 299 days.

(21) Appl. No.: 18/252,552

(22) PCT Filed: Nov. 5, 2021

(86) PCT No.: PCT/JP2021/040764

§ 371 (c)(1),
(2) Date: May 11, 2023

(87) PCT Pub. No.: WO2022/107616

PCT Pub. Date: May 27, 2022

(65) Prior Publication Data

US 2024/0002197 A1 Jan. 4, 2024

(30) Foreign Application Priority Data

Nov. 17, 2020 (JP) ................................ 2020-190769

(51) Int. Cl.
*B66C 13/23* (2006.01)
*B66C 13/16* (2006.01)
(Continued)

(52) U.S. Cl.
CPC .............. *B66C 13/23* (2013.01); *B66C 13/16* (2013.01); *B66C 23/88* (2013.01); *B66D 1/505* (2013.01)

(58) Field of Classification Search
CPC ......... B66C 13/23; B66C 13/16; B66C 23/88; B66D 1/505
See application file for complete search history.

(56) References Cited

U.S. PATENT DOCUMENTS

| | | | | |
|---|---|---|---|---|
| 6,644,629 | B1 * | 11/2003 | Higashi .................... | B66D 1/56 254/361 |
| 10,773,932 | B2 * | 9/2020 | Ogawa .................... | B66C 13/22 |
| 2019/0256328 | A1 * | 8/2019 | Ogawa ..................... | B66D 1/46 |

FOREIGN PATENT DOCUMENTS

| | | |
|---|---|---|
| JP | 2000-313592 A | 11/2000 |
| JP | 2001-063968 A | 3/2001 |

(Continued)

OTHER PUBLICATIONS

JP 2001063968 Machine Translation. (Year: 2001).*
International Search Report issued Jan. 11, 2022 in PCT/JP2021/040764 filed on Nov. 5, 2021, 2 pages.

*Primary Examiner* — Anna M Momper
*Assistant Examiner* — Juan J Campos, Jr.
(74) *Attorney, Agent, or Firm* — Oblon, McClelland, Maier & Neustadt, L.L.P.

(57) ABSTRACT

Provided is a crane and a control method capable of preventing an irregular winding from being caused, without significant deterioration in work efficiency. The crane includes an allowable deceleration rate derivation unit and a winch control unit. The allowable deceleration rate derivation unit derives an allowable deceleration rate representing an allowable value of the deceleration rate of the winding of a suspension rope, from a measured load that is a suspension load measured by a load measurement device. The allowable deceleration rate derivation unit derives the allowable deceleration rate that is decreased with a decrease in the measured load. The winch control unit makes the winding of the suspension rope by a winch device decelerated at a decel-
(Continued)

eration rate limited within a range equal to or less than the allowable deceleration rate.

4 Claims, 7 Drawing Sheets

(51) Int. Cl.
*B66C 23/88* (2006.01)
*B66D 1/50* (2006.01)

(56) References Cited

FOREIGN PATENT DOCUMENTS

| | | | |
|---|---|---|---|
| JP | 2005-255281 | A | 9/2005 |
| WO | WO 2018/056026 | A1 | 3/2018 |

* cited by examiner

V0: WINDING SPEED

Vs1: FIRST DECELERATION START SPEED

Vmx1: FIRST UPPER-LIMIT WINDING SPEED dVL1: ALLOWABLE DECELERATION RATE t: ELAPSED TIME t1: ALLOWABLE DECELERATION TIME

V0: WINDING SPEED

Vs2: SECOND DECELERATION START SPEED

Vmx2: SECOND UPPER-LIMIT WINDING SPEED dVL1: ALLOWABLE DECELERATION RATE t: ELAPSED TIME t2: REQUIRED STOPPING TIME

LUP1: WINDING LENGTH

L1: MEASURED SUSPENSION LENGTH

L0: MINIMUM SUSPENSION LENGTH

CRANE, AND CONTROL METHOD OF CRANE

TECHNICAL FIELD

The present invention relates to a crane capable of winding a suspension rope and a method for controlling the crane.

BACKGROUND ART

A typical crane includes a boom and a winch device. From the boom is suspended a suspended load through a suspension rope. The winch device hoists and lowers the suspended load by winding or unwinding the suspension rope. The winch device includes a winch drum around which the suspension rope is wound, and a motor for rotating the winch drum in a winding direction and an unwinding direction.

There may occur an irregular winding in the crane. The irregular winding is a state where the winding of the suspension rope around the winch drum is disordered. The irregular winding may cause, for example, a temporary sudden drop of the suspended load.

Patent Literature 1 discloses a crane including a control device for controlling a winch. In the crane, a hydraulic cylinder applies a constant load to the suspension rope through a link. The control device stops the winch when the angle of the link exceeds a predetermined angle during the unwinding of the suspension rope, thereby preventing the suspension rope from being excessively delivered upon the landing of the suspended load.

When the load is light, however, the rapid deceleration of the hoisting of the suspension rope by the winch device may involve temporary looseness of the suspension rope to cause the irregular winding.

On the other hand, slow deceleration of the winding of the suspension rope for preventing the irregular winding deteriorates the efficiency in the work of carrying the suspended load by the crane.

CITATION LIST

Patent Literature

Patent Literature 1: Japanese Unexamined Patent Publication No. 2000-313592

SUMMARY OF INVENTION

It is an object of the present invention to provide a crane and crane control method that are capable of preventing an irregular winding from being caused in a winch device by rapid deceleration of the winding of a suspension rope without a significant deterioration in work efficiency.

Provided is a crane including a boom, a winch device, a winch control unit, a load measurement device, and an allowable deceleration rate derivation unit. The boom supports a suspension rope suspended from the boom. The winch device is configured to perform winding and unwinding of the suspension rope. The winch control unit controls the winding and the unwinding of the suspension rope by the winch device. The load measurement device is connected to the suspension rope and measures a load by a suspended load that is suspended from the boom. The allowable deceleration rate derivation unit derives an allowable deceleration rate representing an allowable value of a deceleration rate of winding of the suspension rope, from a measured load. The measured load is a load by the suspended load, measured by the load measurement device. The allowable deceleration rate derivation unit derives the allowable deceleration rate that is decreased with a decrease in the measured load. The winch control unit decelerates the winding of the suspension rope by the winch device at a deceleration rate limited within a range equal to or less than the allowable deceleration rate.

Also provided is a method for controlling a crane that includes the boom, the winch device, and the load measurement device. The method includes a deceleration allowance rate derivation step and a deceleration step. The deceleration allowance rate derivation step is a step of deriving an allowable deceleration rate from the measured load. The allowable deceleration rate represents an allowable value of a deceleration rate of the winding. In the deceleration allowance rate derivation step, the allowable deceleration rate that is decreased with a decrease in the measured load is derived. The deceleration step is a step of decelerating the winding of the suspension rope by the winch device at a deceleration rate limited within a range equal to or less than the allowable deceleration rate.

DETAILED DESCRIPTION

Below will be described an embodiment of the present invention with reference to the drawings. The following embodiment is illustrative of the invention, not intended to limit the scope of the invention.

Figure 1:
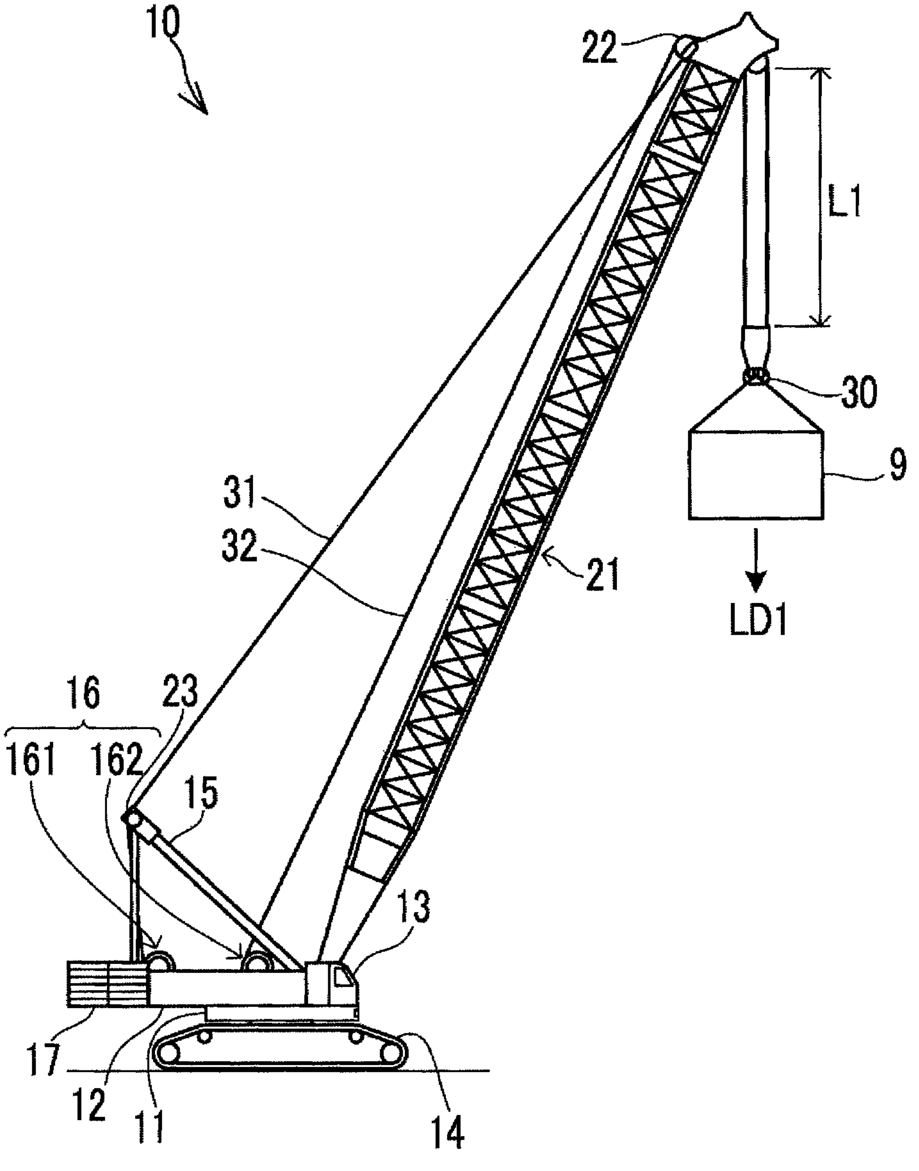
FIG. 1 is a side view of a crane according to an embodiment of the present invention.

FIG. 1 shows a crane 10 according to the embodiment of the present invention. The crane 10 is a work machine that hoists and moves a suspended load 9. The crane 10 illustrated in FIG. 1 is a jib crane.

As shown in FIG. 1, the crane 10 includes a lower traveling body 11, an upper slewing body 12, a cab 13, a gantry 15, a winch device 16, a counterweight 17, a boom 21, a derricking rope 31, a suspension rope 32 and a hook 30. The winch device 16 includes a first winch device 161 and a second winch device 162.

The lower traveling body 11 is a pedestal part that supports the upper stewing body 12 slewably. The crane 10 is a mobile crane. Specifically, the lower traveling body 11 includes a traveling device 14, which performs a traveling motion for moving the entire crane 10. The traveling device 14 illustrated in FIG. 1 is a crawler type of traveling device. The lower traveling body 11 is an example of a lower base body.

The upper slewing body 12 is connected to the upper part of the lower traveling body 11 capably of slewing. The upper slewing body 12 is configured to support the cab 13, the gantry 15, and the winch device 16 so as to be slewed integrally with them. The gantry 15 is fixed to the upper slewing body 12 in a posture of projecting upward from the upper slewing body 12. The upper slewing body 12 further supports the counterweight 17 and the boom 21.

Figure 2:
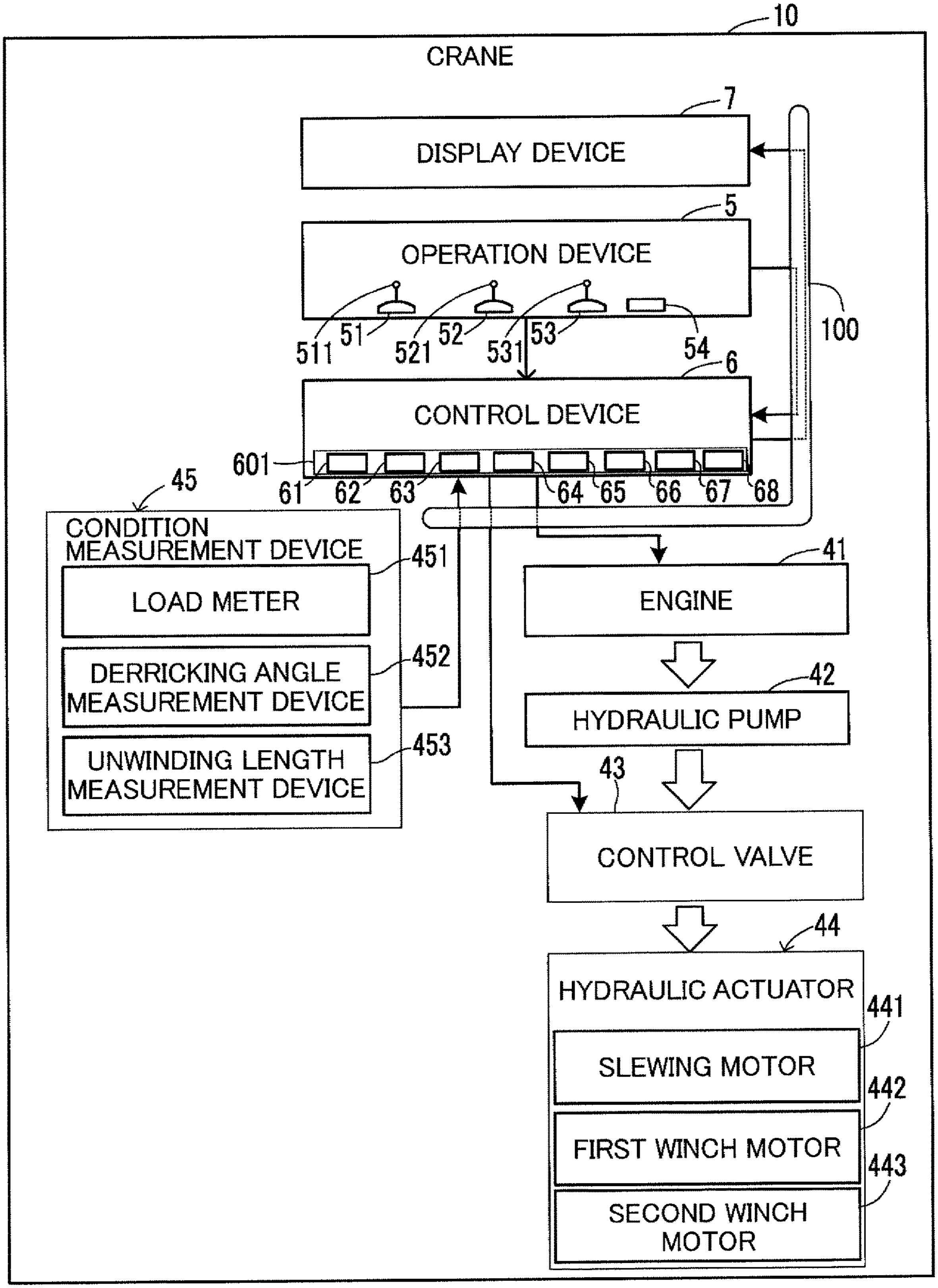
FIG. 2 is a block diagram representing elements for control in the crane.

On the lower traveling body 11 is mounted a slewing motor 441 shown in FIG. 2, which drives the upper slewing body 12 to slew it (see FIG. 2). The cab 13 is an operation room. The boom 21 is connected to the upper slewing body 12 capably of derricking.

The derricking rope 31 is placed on a gantry sheave 23, which is rotatably supported at the tip of the gantry 15. The derricking rope 31 has opposite ends, which are connected to the distal end of the boom 21 and the first winch device 161, respectively.

The first winch device 161 supports the boom 21 through the derricking rope 31. The first winch device 161 is capable of winding and unwinding the derricking rope 31 to thereby change the derricking angle of the boom 21. The first winch device 161 includes a first winch drum and a first winch motor 442 shown in FIG. 2. Around the first winch drum is wound the derricking rope 31. The first winch motor 442 drives the first winch drum rotationally to thereby make the first winch drum wind and unwind the derricking rope 31.

The suspension rope 32 is placed on a point sheave 25, which is rotatably supported at the distal end of the boom 21. The hook 30 is connected to the tip of the suspension rope 32.

The suspended load 9 is engaged with the hook 30 to be thereby suspended from the distal end of the boom 21 through the suspension rope 32. The suspended load 9 thus suspended exerts a downward suspension load LD1 on the suspension rope 32. The boom 21 supports the suspension rope 32 and the suspended load 9 against the suspension load LD1 by the suspended load 9.

The second winch device 162 is capable of winding and unwinding the suspension rope 32 to thereby hoist and lower the hook 30 and the suspended load 9 engaged therewith. The second winch device 162 includes a second winch drum and a second winch motor 443 shown in FIG. 2. Around the second winch drum is wound the suspension rope 32. The second winch motor 443 drives the second winch drum rotationally to thereby make the second winch drum wind and unwind the suspension rope 32.

The counterweight 17 is disposed so as to balance the weight of the counterweight 17 and the load by the boom 21, the hook 30 and the suspended load 9 engaged therewith.

The crane 10 includes a plurality of drive devices as shown in FIG. 2, an operation device 5, a control device 6, and a display device 7, the plurality of driving devices including an engine 41, a hydraulic pump 42, a plurality of control valves 43, and a plurality of hydraulic actuators 44.

The engine 41 is, for example, a diesel engine and drives the hydraulic pump 42. The plurality of control valves 43 are interposed between the hydraulic pump 42 and the plurality of hydraulic actuators 44, respectively, each configured to be opened and closed in response to a control signal that is input from the control device 6 to thereby render the flow of hydraulic fluid supplied from the hydraulic pump 42 to the plurality of hydraulic actuators 44 controllable.

The plurality of hydraulic actuators 44 includes a plurality of hydraulic motors, which include the slewing motor 441, the first winch motor 442, and the second winch motor 443.

The operation device 5 and the display device 7 are devices for human interface, provided in the cab 13. The crane 10 further includes a plurality of condition measurement devices 45 shown in FIG. 2, which measure respective conditions of a plurality of devices included in the crane 10, respectively.

The control device 6 is capable of communicating with a plurality of devices, which include the plurality of condition measurement devices 45 and the operation device 5. The communication is performed through an in-vehicle network 100, such as a Controller Area Network (CAN).

The operation device 5 allows an operation to be applied to the operation device by an operator. The display device 7 is a device for displaying information, for example, a panel display device such as a liquid crystal display unit.

The operation device 5 includes a slewing operation device 51, a derricking operation device 52, a lifting and lowering operation device 53, and an information input device 54 shown in FIG. 2.

The slewing operation device 51 includes a slewing lever 511 and a slewing signal output unit. The slewing lever 511 can be displaced in opposite directions from a neutral position by a slewing operation that is applied to the slewing lever 511 by an operator. The slewing signal output unit outputs a slewing instruction signal corresponding to the direction and magnitude (slewing operation amount) of the slewing operation applied to the slewing lever 511. The slewing instruction signal is input to the control device 6 to instruct the rotational direction and the rotational speed of the slewing motor 441.

The derricking operation device 52 includes a derricking lever 521 and a derricking signal output unit. The derricking lever 521 can be displaced in opposite directions from a neutral position by a derricking operation that is applied to the derricking lever 521 by an operator. The derricking signal output unit outputs a derricking instruction signal corresponding to the direction and magnitude (derricking operation amount) of the derricking operation that is applied to the derricking lever 521. The derricking instruction signal is input to the control device 6 to instruct a rotational direction and a rotational speed of the first winch motor 442.

The lifting and lowering operation device 53 includes a lifting and lowering lever 531 and a lifting and lowering signal output unit. The lifting and lowering lever 531 can be displaced in opposite directions from a neutral position by a lifting or lowering operation that is applied to the lifting and lowering lever 531 by an operator. The lifting and lowering signal output unit outputs a lifting or lowering signal corresponding to the direction and the magnitude (lifting operation amount) of the lifting or lowering operation that is applied to the lifting and lowering lever 531. The lifting or lowering signal is input to the control device 6 to instruct the rotational direction and the rotational speed of the second winch motor 443.

The control device 6 inputs the control signal to the plurality of control valves 43 corresponding to the slewing motor 441, the first winch motor 442 and the second winch motor 443, respectively, in accordance with the slewing instruction signal, the derricking instruction signal, and the lifting or lowering instruction signal that are input from the slewing operation device 51, the derricking operation device 52, and the lifting and lowering operation device 53, respectively.

The information input device 54 allows information to be input to the information input device 54 by an operator. The information input device 54 may be, for example, a touch panel formed integrally with the display device 7. The information input device 54 may, alternatively, be a device that allows information to be input to the information input device 54 through the voice of the operator.

The plurality of condition measurement devices 45 include a load meter 451, a derricking angle measurement device 452, and an unwinding length measurement device 453 shown in FIG. 2. The result of respective measurements performed by the plurality of condition measurement devices 45 is transmitted to the control device 6 through the in-vehicle network 100.

The load meter 451 measures the load that is applied to the boom 21 by the suspended load 9, namely, the suspension load LD1 by the suspended load 9. The load meter 451 is, for example, a load sensor such as a load cell attached to the derricking rope 31. The load meter 451 is an example of a load measurement device.

The derricking angle measurement device 452 measures the derricking angle of the boom 21. The derricking angle measurement device 452 is, for example, an angle meter attached to the boom 21.

The unwinding length measurement device 453 is a device for measuring the unwinding length of the suspension rope 32. The unwinding length is the length of the unwound portion of the suspension rope 32 from the second winch device 162. The unwinding length measurement device 453 includes, for example, a rotor in contact with the suspension rope 32 to be rotated by following the movement of the suspension rope 32, and a rotation detector that counts the number of rotations of the rotor to thereby determine the unwinding length of the suspension rope 32.

Figure 3:
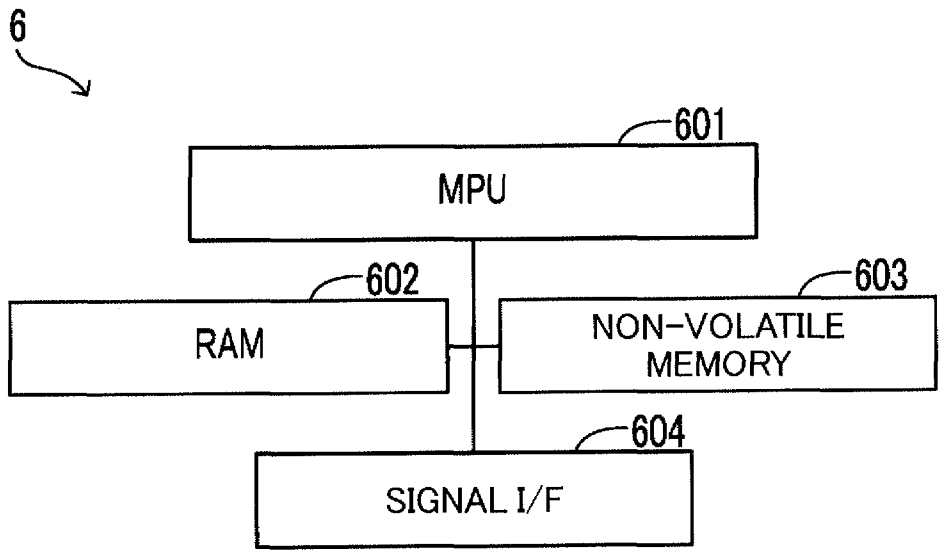
FIG. 3 is a block diagram representing a configuration of a control device in the crane.

As shown in FIG. 3, the control device 6 includes a miro processing unit (MPU) 601, a random access memory (RAM) 602, a non-volatile memory 603 and a signal interface 604. Each of the RAM 602 and the non-volatile memory 603 is a storage device that stores data readable by a computer.

The MPU 601 is an example of a processor that executes a program stored in the non-volatile memory 603 to thereby carry out various data-processing and control.

The RAM 602 is a volatile memory that temporarily stores the program to be executed by the MPU 601 and the data to be derived or referenced by the MPU 601.

The non-volatile memory 603 previously stores the program to be executed by the MPU 601 and the data to be referenced by the MPU 601. The non-volatile memory 603 is, for example, an electrically erasable programmable read only memory (EEPROM) or a flash memory.

The signal interface 604 converts the measurement signal that is output from the condition measurement device 45 into digital data and transmits the digital data to the MPU 601. The signal interface 604 further converts the control command that is output from the MPU 601 into a control signal such as a current signal or a voltage signal and inputs the signal to the device to be controlled.

The MPU 601 of the control device 6 includes a plurality of processing modules that are realized by execution of a predetermined computer program. As shown in FIG. 2, the plurality of processing modules include a main processing unit 61, a slewing control unit 62, a derricking control unit 63, a lifting and lowering control unit 64, and a suspension length derivation unit 65.

The main processing unit 61 executes a start control for starting various processing when the control device 6 is activated, a control of the display device 7, and processing in accordance with the input of the information to the information input device 54.

The slewing control unit 62 inputs the control signal to the control valve 43 corresponding to the slewing motor 441, among the plurality of control valves 43, to thereby control the slewing direction and the slewing speed of the upper slewing body 12.

The derricking control unit 63 inputs the control signal to the control valve 43 corresponding to the first winch motor 442, among the plurality of control valves 43, to thereby control the unwinding and winding of the derricking rope 31 performed by the first winch device 161. The derricking control unit 63, thus, controls the derricking angle of the boom 21.

The lifting and lowering control unit 64 inputs a control signal to the control valve 43 corresponding to the second winch motor 443, among the plurality of control valves 43, to thereby control the unwinding and winding of the suspension rope 32 performed by the second winch device 162. The lifting and lowering control unit 64, thus, controls the height of the suspended load 9.

The lifting and lowering operation device 53 is an example of a winch operation device to which a winch operation for instructing the motion of the second winch device 162 is applied. The lifting and lowering control unit 64 is an example of a winch control unit that controls the winding and the unwinding by the second winch device 162 in accordance with the winch operation applied to the lifting and lowering operation device 53.

The suspension length derivation unit 65 derives a suspension length L1 shown in FIG. 1 from the unwinding length measured by the unwinding length measurement device 453, the predetermined length of the boom 21, and the derricking angle measured by the derricking angle measurement device 452. The suspension length L1 is the length of the suspended portion of the suspension rope 32 from the distal end of the boom 21.

The unwinding length measurement device 453 and the suspension length derivation unit 65 are an example of suspension length measurement device that measures the suspension length L1 of the suspension rope 32. The lifting and lowering control unit 64 is capable of controlling the suspension length L1 by means of inputting the control signal to the control valve 43 corresponding to the first winch motor 442 among the plurality of control valves 43.

The control device 6 performs a winding deceleration control. The winding deceleration control is a control of the deceleration of the winding of the suspension rope 32 performed by the second winch device 162, for solving the following problems related to the winding. Rapid deceleration of the hoisting of the suspension rope 32 by the second winch device 162 with the suspended load 9 light may involve temporary looseness in the suspension rope 32 to cause an irregular winding in the second winch device 162. Slow deceleration of the winding for preventing such irregular winding deteriorates the efficiency in work of carrying the suspended load 9 by the crane 10. The winding deceleration control prevents the irregular winding from being caused in the second winch device 162 by the above rapid deceleration of the winding of the suspension rope 32, without significant deterioration in the work efficiency.

The MPU 601 of the control device 6 further includes, as the processing module realized by the execution of the computer program, an allowable deceleration rate derivation unit 66, a first upper-limit speed derivation unit 67, and a second upper-limit speed derivation unit 68, as shown in FIG. 2.

The lifting and lowering control unit 64, the allowable deceleration rate derivation unit 66, the first upper-limit speed derivation unit 67, and the second upper-limit speed derivation unit 68 execute the winding deceleration control.

Figure 4:
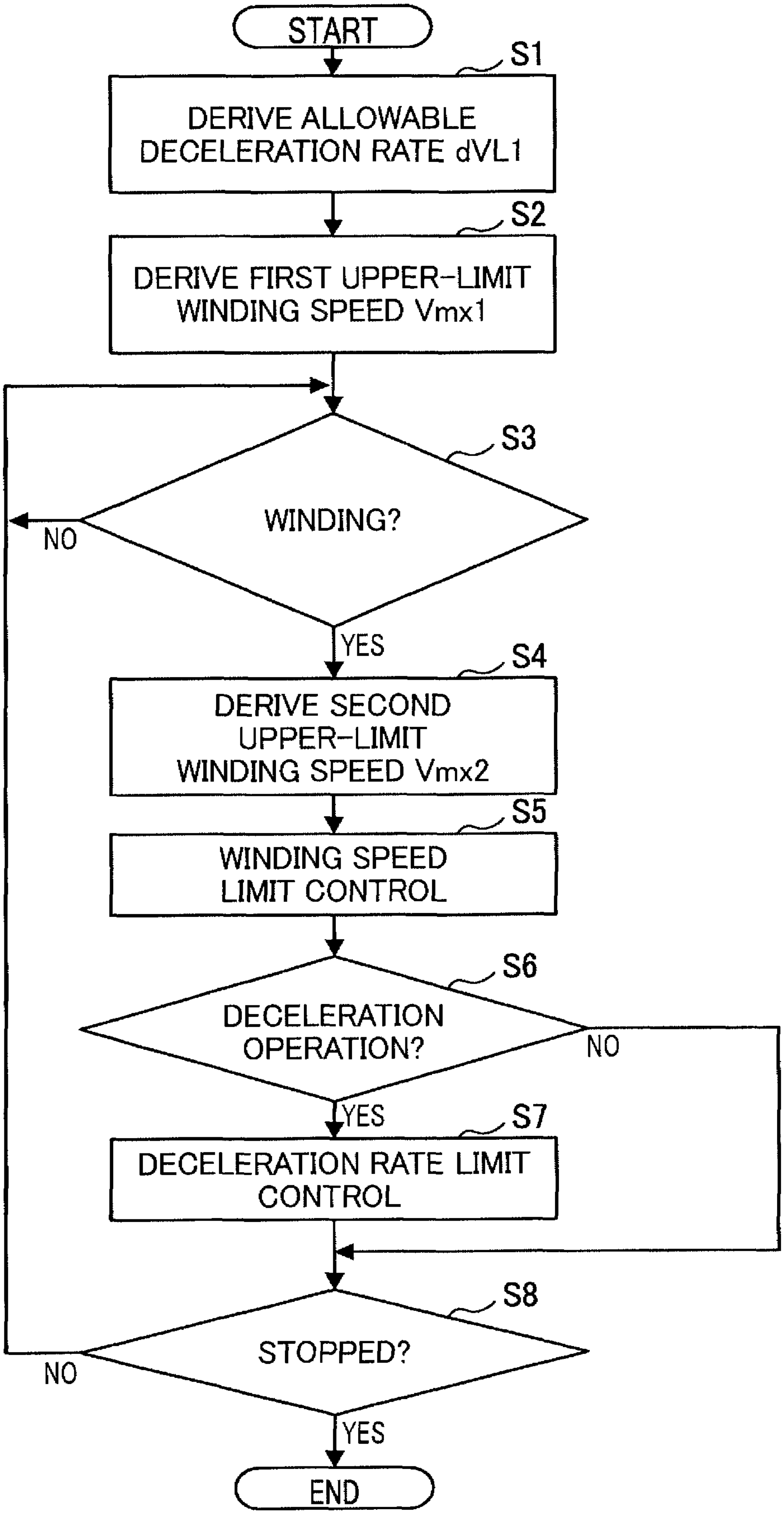
FIG. 4 is a flowchart showing an example of a winding deceleration control performed by the control device.

Below will be described an example of the winding deceleration control with reference to the flowchart shown in FIG. 4.

The allowable deceleration rate derivation unit 66 starts the winding deceleration control, for example, when a measured load changes beyond a predetermined allowable range. The measured load is a load that is measured by the load meter 451, namely, the suspension load LD1.

Figure 5A:
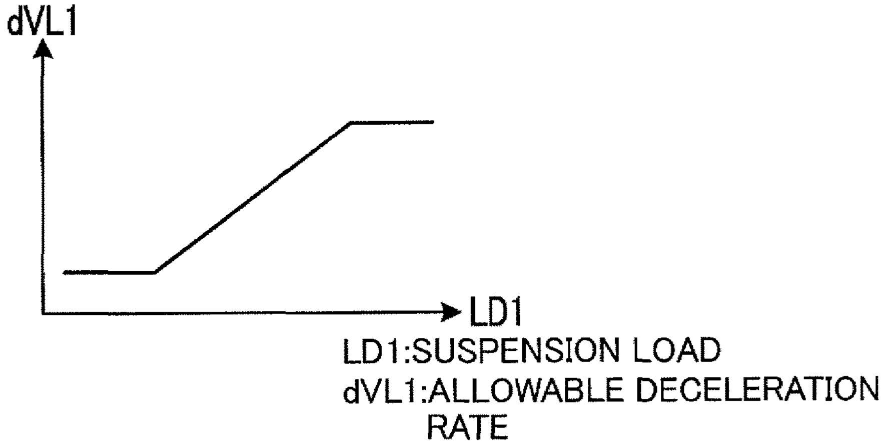
FIG. 5A is a graph showing an example of an allowable deceleration rate that is continuously decreased with a decrease in a suspension load.
Figure 5B:
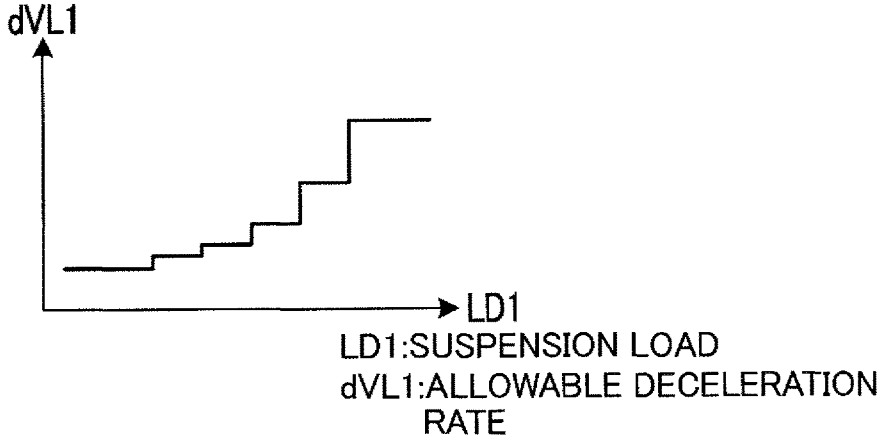
FIG. 5B is a graph showing an example of an allowable deceleration rate that is decreased in multiple stages with a decrease in the suspension load.
Figure 5C:
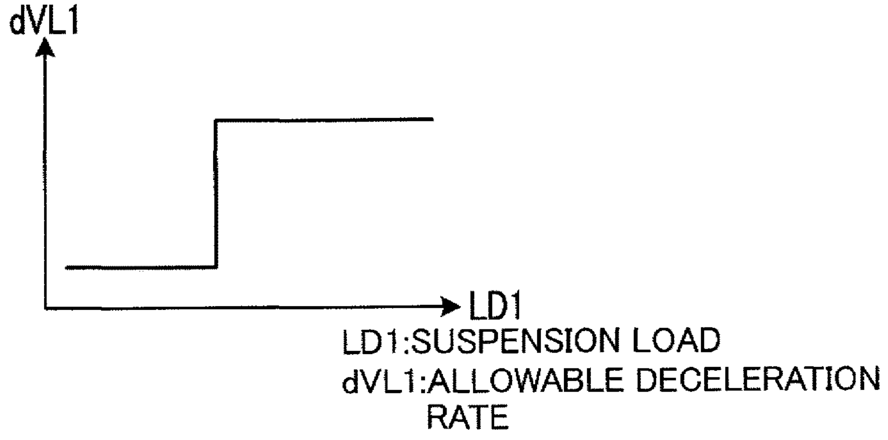
FIG. 5C is a graph showing an example of an allowable deceleration rate that is varied in two stages with a decrease in the suspension load.

In the winding deceleration control, the allowable deceleration rate derivation unit 66 acquires data of the measured load, i.e., the measured suspension load LD1, from the load meter 451, and derives an allowable deceleration rate dVL1 that is shown, for example, in any of FIGS. 5A, 5B and 5C, from the suspension load LD1. The allowable deceleration rate dVL1 represents an allowable value of the deceleration rate of the winding of the suspension rope 32.

In the present embodiment, the allowable deceleration rate dVL1 is a positive value. The larger the value of the allowable deceleration rate dVL1, therefore, the rapider deceleration of the winding of the suspension rope 32 is allowed. In other words, the smaller value of the allowable deceleration rate dVL1 causes the winding of the suspension rope 32 to be required to be decelerated more slowly, that is, causes the deceleration rate to be limited more greatly.

The allowable deceleration rate derivation unit 66 derives the allowable deceleration rate dVL1 that is decreased with a decrease in the suspension load LD1. Each of FIGS. 5A, 5B, and 5C shows an example of a relationship between the suspension load LD1 and the allowable deceleration rate dVL1.

The allowable deceleration rate dVL1 illustrated in FIG. 5A is decreased continuously with a decrease in the suspension load LD1. The allowable deceleration rate dVL1 illustrated in FIG. 5B is decreased in multiple stages with a decrease in the suspension load LD1. The allowable deceleration rate dVL1 illustrated in FIG. 5C is decreased in two stages with a decrease in the suspension load LD1.

The allowable deceleration rate derivation unit 66 stores, for example, a calculation formula or a look-up table that specifies the relationship between the suspension load LD1 and the allowable deceleration rate dVL1 as described above, and applies the suspension load LD1 thereto to derive the allowable deceleration rate dVL1.

The control device 6 executes a step S2 following the step S1. In the step S2, the first upper-limit speed derivation unit 67 derives a first upper-limit winding speed Vmx1 from the allowable deceleration rate dVL1 derived in the step S1 and a predetermined allowable deceleration time t1.

Figure 6:
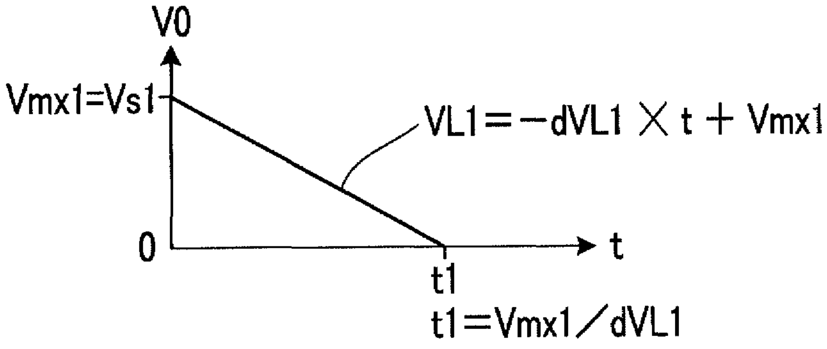
FIG. 6 is a graph showing a relationship between an allowable deceleration time according to the winding deceleration control and a first upper-limit winding speed.

The first upper-limit speed derivation unit 67 calculates a first starting speed Vs1 shown in FIG. 6 as the first upper-limit winding speed Vx1. The first starting speed Vs1 is such a speed of the winding at the starting of deceleration that the allowable deceleration time t1 is required for the stop of the winding of the suspension rope 32 by the second winch device 162 when the winding of the suspension rope 32 by the second winch device 162 is decelerated at the allowable deceleration rate dVL1 from the first starting speed Vs1.

For example, the first upper-limit speed derivation unit 67 derives the first upper-limit winding speed Vmx1 based on the following equation (1):

$$t1 = Vmx1/dVL1 \quad (1)$$

The control device 6 executes a step S3 following the step S2. In the step S3, the lifting and lowering control unit 64 judges whether or not the winding of the suspension rope 32 by the second winch device 162 is being performed. Incidentally, the lifting and lowering control unit 64 executes the control of the second winch device 162 in accordance with the lifting or lowering operation applied to the lifting and lowering operation device 53 in parallel with the processing in and after the step S3.

When judging that the winding is being performed (YES in the step S3), the lifting and lowering control unit 64 executes the processing in and after a step S4. This processing is to control the deceleration of the winding of the second winch device 162 in accordance with the lifting or lowering operation applied to the lifting and lowering operation device 53 within a range of the winding speed not exceeding the first upper-limit winding speed Vmx1 or a second upper-limit winding speed Vmx2 shown in FIG. 7.

The lifting and lowering control unit 64 derives the time change rate of the unwinding length measured by the unwinding length measurement device 453 and the time change rate of the time change rate thereof, thereby determining the speed and the acceleration of the winding of the suspension rope 32.

Figure 7:
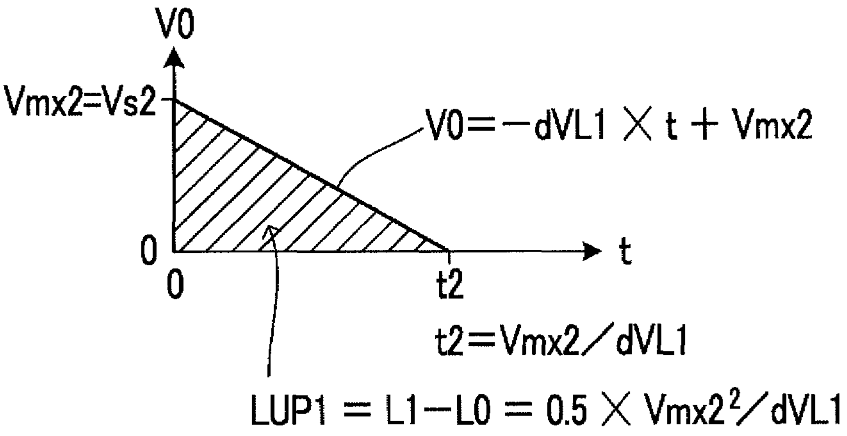
FIG. 7 is a graph showing a relationship between a required stopping time according to the winding deceleration control and a second upper-limit winding speed.

The second upper-limit speed derivation unit 68 derives the second upper-limit winding speed Vmx2 shown in FIG. 7 from the allowable deceleration rate dVL1 derived in the step S1, the suspension length L1 derived by the suspension length derivation unit and a minimum suspension length L0, in the step S4. The minimum suspension length L0 is the minimum value of the suspension length L1, being preset by the main processing unit 61, for example, based on information that is input to the information input device 54. The suspension length L1 is measured by the suspension length measurement device constituted by the unwinding length measurement device 453 and the suspension length derivation unit 65.

The second upper-limit speed derivation unit 68 derives a second starting speed Vs2 shown in FIG. 7 as the second upper-limit winding speed Vmx2. The second starting speed Vs2 is such a speed of the winding at the start of deceleration that the suspension length L1 is decreased from the current measuring length to the minimum suspension length L0 in the period until the stop of the winding by the second winch device 162, when the winding of the suspension rope 32 by the second winch device 162 is decelerated from the second starting speed Vs2 at the allowable deceleration rate dVL1.

FIG. 7 shows the required stopping time t2 corresponding to the second upper-limit winding speed Vx2 and a winding length LUP1. The required stopping time t2 is a time required for the stop of the winding of the suspension rope 32 by the second winch device 162 when the winding is decelerated from the second starting speed Vs2 at the allowable deceleration rate dVL1. The winding length LUP1 is the length of the wound portion of the suspension rope 32 that is wound during the decrease in the suspension length L1 from the current measurement length to the minimum suspension length L0.

For example, the second upper-limit speed derivation unit 68 derives the second upper-limit winding speed Vmx2 based on the following equation (2):

$$Vmx2 = (2 \times dVL1)^{0.5} \quad (2).$$

The control device 6 executes a step S5 following the step S4. In the step S5, the lifting and lowering control unit 64 executes a winding speed limit control. The winding speed limit control is a control for limiting the speed of the winding of the suspension rope 32 by the second winch device 162 within a range equal to or less than the first upper-limit winding speed Vmx1 and within a range equal to or less than the second upper-limit winding speed Vmx2. In this control, when the winding speed of the suspension rope 32 corresponding to the lifting or lowering operation applied to the lifting and lowering operation device 53 is equal to or less than the first upper-limit winding speed Vmx1 and equal to or less than the second upper-limit winding speed Vmx2, the lifting and lowering control unit 64 controls the speed of the winding by the second winch device 162 in accordance with the lifting or lowering operation. When the winding speed of the suspension rope 32 corresponding to the lifting or lowering operation applied to the lifting and lowering operation device 53, conversely, exceeds at least one of the first upper-limit winding speed Vmx1 and the second upper-limit winding speed Vmx2, the lifting and lowering control unit 64 controls the winding by the second winch device 162 so as to render the winding speed of the suspension rope 32 equal to the lower speed selected from the first upper-limit winding speed Vmx1 and the second upper-limit winding speed Vmx2.

The control device 6 executes a step S6 following the step S5. In the step S6, the lifting and lowering control unit 64 judges whether or not a deceleration operation for decelerating the winding of the suspension rope 32 is applied to the lifting and lowering operation device 53. Only when judging that the deceleration operation is applied (YES in the step S6), the lifting and lowering control unit 64 executes the deceleration rate limit control of the step S7.

The deceleration rate limit control is a control for limiting the deceleration rate of the deceleration of the winding of the suspension rope 32 by the second winch device 162 within a range equal to or less than the allowable deceleration rate dVL1. The lifting and lowering control unit 64 can limit the deceleration rate of the winding of the suspension rope 32 within a range equal to or less than the allowable deceleration rate dVL1, for example, by means of inputting a control signal for feedback control to the control valve 43 corresponding to the second winch motor 443 among the plurality of control valves 43 on the basis of the acceleration of the winding of the suspension rope 32.

The lifting and lowering control unit 64, in step S8, judges whether or not the winding by the second winch device 162 has been stopped, regardless of the performance of the deceleration rate limit control, and continues the winding deceleration control (the speed limit control or both of the speed limit control and the deceleration rate limit control) until the winding is judged to be stopped (NO in the step S8). Upon judging that the winding by the second winch device 162 has been stopped (YES in the step S8), the lifting and lowering control unit 64 terminates the winding deceleration control.

The lifting and lowering control unit 64 and the allowable deceleration rate derivation unit 66, thus, can prevent the irregular winding from being caused in the second winch device 162 by the rapid deceleration of the winding of the suspension rope 32, by means of limiting the deceleration of the winding of the suspension rope 32 more greatly with a decrease in the suspension load LD1, as shown in FIGS. 5A to 5C. On the other hand, the lifting and lowering control unit 64 and the allowable deceleration rate derivation unit 66 can restrain the efficiency in the work of carrying the suspended load 9 by the crane 10 from being unnecessarily deteriorated, by means of reducing or releasing the limitation of the deceleration of the winding by the suspension rope 32 when the suspension load LD1 is large, that is, when the irregular winding is less likely to occur.

Moreover, limiting the winding speed of the suspension rope 32 to the first upper-limit winding speed Vmx1 or less, the lifting and lowering control unit 64 according to the embodiment enable the required stopping time required for the stop of the winding of the suspension rope 32 after the start of the deceleration to be confined within a predetermined allowable deceleration time t1. This prevents the required stopping time from being excessively prolonged by the deceleration limit control (step S7).

Furthermore, limiting the winding speed of the suspension rope 32 to the second upper-limit winding speed Vmx2 or less, the lifting and lowering control unit 64 according to the embodiment prevents the suspended load 9 from being hoisted beyond the height corresponding to the minimum suspension length L0, regardless of the limitation of the deceleration rate. The control based on the second upper-limit winding speed Vmx2 is useful for the case of requiring the restriction of the lifting height of the suspended load 9, for example, prevention of the suspended load 9 from being raised to the vicinity of the distal end of the boom 21.

The crane according to the present invention is not limited to the above-described embodiments. For example, the crane 10 is modifiable as follows.

In the crane 10, it is also possible that: the information input device 54 is configured to allow a mode selection operation to be input to the information input device 54; the main processing unit 61 is configured to select an action mode corresponding to the mode selection operation from among a plurality of preset operation modes for the speed limit control; and the lifting and lowering control unit 64 is configured to determine execution or non-execution of the speed limit control and determine contents of the speed limit control, according to the selected operation mode. The plurality of action modes include, for example, a mode of omitting one or both of the winding speed limit control based on the first upper-limit winding speed Vx1 and the winding speed limit control based on the second upper-limit winding speed Vx2, and a mode of performing both the controls.

In the crane 10, processing modules and controls for one or both of the first upper-limit winding speed Vx1 and the second upper-limit winding speed Vx2 are omittable.

The allowable deceleration rate derivation unit 66 may derive a value corresponding to the allowable deceleration rate dVL1, which is not limited to the value of the allowable deceleration rate dVL1 itself. The allowable deceleration rate derivation unit 66, for example, may be configured to derive a winding target speed that gradually changes from the current speed to the stop of the winding of the suspension rope 32, and the lifting control unit 64 may be configured to perform a control to render the actual winding speed closer to the winding target speed. The winding target speed is the target speed that is set in consideration with the allowable deceleration rate dVL1.

Thus is provided a crane and crane control method that are capable of preventing an irregular winding from being caused in a winch device by rapid deceleration of the winding of a suspension rope without a significant deterioration in work efficiency.

Provided is a crane including a boom, a winch device, a winch control unit, a load measurement device, and an allowable deceleration rate derivation unit. The boom supports a suspension rope suspended from the boom. The winch device is configured to perform winding and unwinding of the suspension rope. The winch control unit controls the winding and the unwinding of the suspension rope by the winch device. The load measurement device is connected to the suspension rope and measures a load by a suspended load that is suspended from the boom. The allowable deceleration rate derivation unit derives, from a measured load, an allowable deceleration rate representing an allowable value of a deceleration rate of winding of the suspension rope. The measured load is a load by the suspended load, measured by the load measurement device. The allowable deceleration rate derivation unit derives the allowable deceleration rate that is decreased with a decrease in the measured load. The winch control unit decelerates the winding of the suspension rope by the winch device at a deceleration rate limited within a range equal to or less than the allowable deceleration rate.

Also provided is a method for controlling a crane that includes the boom, the winch device, and the load measurement device. The method includes a deceleration allowance rate derivation step and a deceleration step. The deceleration allowance rate derivation step is a step of deriving an allowable deceleration rate from the measured load. The allowable deceleration rate represents an allowable value of a deceleration rate of the winding. In the deceleration allowance rate derivation step, the allowable deceleration rate that is decreased with a decrease in the measured load is derived. The deceleration step is a step of decelerating the winding of the suspension rope by the winch device at a deceleration rate limited within a range equal to or less than the allowable deceleration rate.

According to the crane and the control method, a small allowable deceleration rate is derived from the measured load, when the measured load is small, to greatly limit the deceleration rate of the winding of the suspension rope, which prevents irregular winding from being caused by the rapid deceleration of the winding; on the other hand, a large allowable deceleration rate is derived from the measured load, when the measured load is large, to reduce or release the limitation of the deceleration rate, which restrains work efficiency from being unnecessarily deteriorated.

It is preferable that the crane further includes a first upper-limit winding speed derivation unit that derives a first upper-limit winding speed from the allowable deceleration rate and a predetermined allowable deceleration time and the winch control unit is configured to limit the speed of the winding of the suspension rope by the winch device within a range equal to or less than the first upper-limit winding speed. The first upper-limit winding speed is a speed that renders a time required for the stop of the winch device after the start of the deceleration of the winding of the suspension rope by the winch device at the allowable deceleration rate, when the speed of winding is the first upper-limit winding speed, equal to the allowable deceleration time. The winding speed limit control based on the first upper-limit winding speed can prevent the time required for the stop of the winding by the winch device from being excessively prolonged by the limitation of the deceleration rate.

Preferably, the crane further includes a suspension length measurement device that measures a suspension length that is a length of a portion of the suspension rope, which portion is suspended from the boom, and a second upper-limit winding speed derivation unit that derives a second upper-limit winding speed from the allowable deceleration rate, a measured suspension length that is the suspension length measured by the suspension length measurement device, and a preset minimum suspension length, wherein the winch control unit is configured to limit the speed of the winding of the suspension rope by the winch device within a range equal to or less than the second upper-limit winding speed. The second upper-limit winding speed is a speed that causes the suspension length to be decreased from the measured suspension length to the minimum suspension length in a period from start of the deceleration of the winding at the allowable deceleration rate, when the speed of winding of the suspension rope by the winch device is the second upper-limit winding speed, to the stop of the winch device. The winding speed limit control based on the second upper-limit winding speed can prevent the suspension length from being excessively small upon the stop of the winding by the winch device.

The invention claimed is:

1. A crane, comprising:

a boom that supports a suspension rope suspended from the boom;

a winch device configured to perform winding and unwinding of the suspension rope;

a winch control unit that controls the winding and the unwinding of the suspension rope by the winch device;

a load measurement device that is connected to the suspension rope and measures a load by a suspended load that is suspended from the boom; and an allowable deceleration rate derivation unit that derives an allowable deceleration rate that represents an allowable value of a deceleration rate of the winding of the suspension rope, from a measured load that is a load by the suspended load and measured by the load measurement device, wherein:

the allowable deceleration rate derivation unit derives the allowable deceleration rate that is decreased with a decrease in the measured load; and the winch control unit decelerates the winding of the suspension rope by the winch device at a deceleration rate limited within a range equal to or less than the allowable deceleration rate.

2. The crane according to claim 1, further comprising a first upper-limit winding speed derivation unit that derives a first upper-limit winding speed from the allowable deceleration rate and a predetermined allowable deceleration time, the first upper-limit winding speed being a speed that renders a time required for stop of the winch device after start of the deceleration of the winding of the suspension rope by the winch device at the allowable deceleration rate, when the speed of winding is the first upper-limit winding speed, equal to the allowable deceleration time, wherein the winch control unit is configured to limit the speed of the winding of the suspension rope by the winch device within a range equal to or less than the first upper-limit winding speed.

3. The crane according to claim 1, further comprising: a suspension length measurement device that measures a suspension length that is a length of a portion of the suspension rope, the portion being suspended from the boom, and a second upper-limit winding speed derivation unit that derives a second upper-limit winding speed from the allowable deceleration rate, a measured suspension length that is the suspension length measured by the suspension length measurement device, and a preset minimum suspension length, the second upper-limit winding speed being a speed that causes the suspension length to be decreased from the measured suspension length to the minimum suspension length in a period from start of the deceleration of the winding at the allowable deceleration rate, when the speed of winding of the suspension rope by the winch device is the second upper-limit winding speed, to the stop of the winch device, wherein the winch control unit is configured to limit the speed of the winding of the suspension rope by the winch device within a range equal to or less than the second upper-limit winding speed.

4. A method for controlling a crane that includes a boom that supports a suspension rope suspended from the boom, a winch device configured to wind and unwind the suspension rope, and a load measurement device that is connected to the suspension rope and measures a load by a suspended load suspended from the boom, the method comprising:

an allowable deceleration rate derivation step of deriving an allowable deceleration rate from a measured load that is a suspension load measured by the load measurement device, the allowable deceleration rate representing an allowable value of a deceleration rate of the winding and decreased with a decrease in the measured load; and a deceleration step of decelerating the winding of the suspension rope by the winch device at a deceleration rate limited within a range equal to or less than the allowable deceleration rate.

* * * * *